United States Patent
Reik et al.

(12)

(10) Patent No.: US 6,575,047 B2
(45) Date of Patent: Jun. 10, 2003

(54) TORQUE SENSOR FOR A CONTINUOUSLY VARIABLE TRANSMISSION

(75) Inventors: Wolfgang Reik, Bühl (DE); Ulrich Mair, Bühl (DE); Wolfgang Haas, Bühl (DE)

(73) Assignee: WK Lamellen und Kupplungsban Beteiligungs KG, Bühl (DE)

( * ) Notice: Subject to any disclaimer, the term of this patent is extended or adjusted under 35 U.S.C. 154(b) by 0 days.

(21) Appl. No.: 09/945,544

(22) Filed: Sep. 2, 2001

(65) Prior Publication Data

US 2002/0056327 A1 May 16, 2002

(30) Foreign Application Priority Data

Sep. 8, 2000 (DE) .......................................... 100 44 340

(51) Int. Cl.⁷ ................................................. G01L 3/02

(52) U.S. Cl. .................................................. 73/862.191
(58) Field of Search ....................... 73/862.191, 862.31, 73/862.29, 862.321, 826.328, 862.08

(56) References Cited

U.S. PATENT DOCUMENTS 6,327,926 B1 * 12/2001 Chilman ..................... 280/236

* cited by examiner

*Primary Examiner*—Hezron Williams
*Assistant Examiner*—Corey D. Mack
(74) *Attorney, Agent, or Firm*—Alfred J. Mangels

(57) ABSTRACT

A torque sensor for producing a torque-dependent pressing force. The sensor includes at least one input member and at least one output member. A power-transmitting element is arranged between the input and output members. The torque sensor can be utilized in a continuously variable transmission.

26 Claims, 6 Drawing Sheets

TORQUE SENSOR FOR A CONTINUOUSLY VARIABLE TRANSMISSION

BACKGROUND OF THE INVENTION

1. Field of the Invention

The present invention relates to a torque sensor, to a continuously variable transmission that includes a torque sensor, as well as to a method for controlling a torque sensor associated with a continuously variable transmission.

2. Description of the Related Art

Torque sensors, continuously variable transmissions, as well as methods for controlling torque sensors and continuously variable transmissions are already known.

The invention is directed to a torque sensor with a different design, to a continuously variable transmission with a different design, as well as to a different method for controlling a torque sensor and/or for controlling a continuously variable transmission.

In accordance with one particular aspect, the invention is directed to a more consistent continuously variable transmission having a torque sensor.

In accordance with one particular aspect, the invention is directed to a torque sensor as well as to a continuously variable transmission that have a simpler design and that ensure higher operational reliability.

In accordance with one particular aspect, the invention is directed to a method for operating a torque sensor and/or a continuously variable transmission that can be conducted with little effort and high operational reliability.

The objects of the invention are achieved with a torque sensor that displays at least one of the features that are explained in the following description and claims, or that are shown in the drawing figures.

The objects of the invention are furthermore achieved with a continuously variable transmission that has at least one of the features that are explained in the following description or claims, or that are shown in the drawing figures.

The objects of the invention are furthermore achieved with a method for controlling a torque sensor, or for controlling a continuously variable transmission having a torque sensor that has at least one of the features that are explained in the following description or claims, or that are shown in the drawing figures.

SUMMARY OF THE INVENTION

The invention is directed in particular to a torque sensor that has at least one input member as well as at least one output member, and a transmitting element that is arranged between the input member and the output member and which can at least be moved in the radial direction. The transmitting element is arranged particularly in the axial direction between the input member and the output member of the torque sensor. The transmitting element can transmit power and possibly torque between the input member and the output member. Torque can be applied to the output member externally, wherein the transmitting element causes the output member to generate a pressing force.

In accordance with the present invention, the input member is in particular a component that is rotatably arranged, and the output member is in particular a component that is arranged in a fixed manner in relation to a shaft. The invention, however, should not thereby be limited. In accordance with the present invention, the input member preferably consists of a disk-like component, as does the output member. In accordance with the present invention, the output member may be coupled with a disk and/or a conical disk of a continuously variable transmission, or it can be designed as one piece together with the disk.

The transmitting element in accordance with the invention is particularly a component that is movably arranged relative to the output member and/or relative to the input member. The transmitting element can have the design of a ball, a roller, a spreader body, or other design.

The driving power generated by the output member in accordance with the present invention should be interpreted particularly as power that is applied onto the output member and can be passed on to surrounding components and preferably is linear.

The transmitting element's ability to move in the radial direction is designed in accordance with the present invention in such a way that the transmitting element can also be moved in the circumferential direction. In accordance with the present invention, it is particularly provided that the transmitting element is additionally movably arranged in at least one other direction relative to the input and/or output member, and particularly in the circumferential direction and/or in the axial direction.

In accordance with the invention there is particularly provided a torque sensor for a continuously variable transmission that can transmit torque in a frictionally-engaged manner. The power that is transmitted through at least one transmitting element between the input member and the output member has a component of power acting in the circumferential direction and a component of power acting in the axial direction. The continuously variable transmission is equipped with sets of disks, between which torque can be transmitted in a frictionally-engaged manner through an endless, torque-transmitting means. The power that is transmitted between the endless, torque-transmitting means and the respective disk set and/or the respective disks also has a component of power that acts largely in the circumferential direction. The torque sensor is associated with at least one of those disk sets. In accordance with the invention, the power component acting in the circumferential direction, for the power that is transmitted between the input member and the output member of the torque sensor, is proportional to the power component acting in the circumferential direction that is transmitted by the disk set associated with the torque sensor between the endless, torque-transmitting means and that disk set. The proportionality factor between those power components acting in the circumferential direction is preferably equal to 1, so that the power component transmitted between the input member and the output member in the circumferential direction corresponds with the power component transmitted in the circumferential direction between the disk set that is associated with that torque sensor and the endless, torque-transmitting means.

In accordance with the invention, a torque sensor is provided that is equipped with an input member as well as an output member and a transmitting element that is arranged between the input member and the output member. The transmitting element is supported against a ramp of the input member and the output member, respectively, during the transmission of torque and/or power between those parts. Torque that is applied to the input member generates a pressing force on the output member.

For the purpose of torque transmission in a continuously variable transmission, the respective disk sets of that transmission are loaded by a pressing force, particularly an axially acting pressing force. As a function of the torque that is to be transmitted, and possibly as a function of the transmission ratio that is established during torque transmission, the necessary pressing forces that are required to be able to transmit the torque that is to be transmitted between the disk sets are available for each of the disk sets. In accordance with the invention—both during a pushing operation as well as during a pulling operation—the same tracks and/or ramps that are arranged on the input member and/or the output member are acting, as are the same transmitting elements that are provided on the torque sensor, wherein the deviation between the pressing force generated by the torque sensor and the pressing force on the respective disk set required for torque transmission is largely identical during a pushing operation and a pulling operation. In accordance with the invention, preferably a feature is provided so that during a pushing operation as well as during a pulling operation, with a given torque that is supposed to be transmitted and/or a given transmission ratio, the same tracks and/or ramps of the torque sensor are used for generating the pressing force, without the deviation of the generated pressing force being different from the pressing force required on the respective disk set.

In accordance with the invention there is particularly provided a torque sensor where one or more transmitting elements transmit power between an input member and an output member of the torque sensor, wherein the torque load on the input member causes a pressing force to be generated on the output member, and wherein the position of the torque sensor is not dependent upon the direction of the load that is present on the torque sensor and/or on the continuously variable transmission associated with that torque sensor.

A preferred torque sensor in accordance with the invention is designed in such a way, and interacts with a continuously variable transmission in such a way, that the radial position of at least one of the transmitting elements is controlled as a function of the position of the endless, torque-transmitting means. In particular, the torque sensor is associated with a disk set of the continuously variable transmission, wherein the radial position of the transmitting element or elements is controlled as a function of the travel radius of an endless, torque-transmitting means on that disk set.

The transmitting element or elements of the torque sensor preferably assume the radial position that corresponds to the travel radius of the endless, torque-transmitting means on one of the disk sets. In a preferred embodiment, one torque sensor is provided per set of disks, wherein the transmitting element or elements associated with those torque sensors are basically arranged in a radial position that corresponds largely to the travel radius on the disk sets associated with those respective torque sensors.

Preferably, at least one transmitting element is restrictively guided. In a particularly preferred embodiment, the restricted guidance of the transmitting element is effected by ramps or tracks that are arranged on the input member or the output member of the torque sensor.

Predetermined movements of at least one disk set of a continuously variable transmission or of an endless, torque-transmitting means of that continuously variable transmission are preferably coupled with predetermined movements of a transmitting element of the torque sensor. In a particularly preferred embodiment, a predetermined relative adjustment of the disks of a disk set of the continuously variable transmission, particularly in the axial direction, causes a transmitting element of a torque sensor to be moved at least also in the radial direction, in particular in such a way that an increase in the axial spacing of the disks of that disk set causes the transmitting element to be moved radially inward, and that a decrease in the axial spacing of the disks of the disk set causes the transmitting element to be moved radially outward.

In a particularly preferred embodiment, the radial position of a transmitting element of a torque sensor depends on the transmission ratio in a continuously variable transmission that is associated with that torque sensor, especially with a defined spacing between axes of the shafts of the continuously variable transmission, between which an infinitely variable transmission process can take place.

Preferably, at least one transmitting element of the torque sensor is moved along a ramp that is arranged on the input member and/or on the output member of the torque sensor, in such a way that each radial position of the transmitting element is allocated exactly one defined position of the ramp and/or track.

The travel tracks of two or more transmitting elements of a torque sensor are preferably coupled with each other at least in part, particularly via a retainer that may contain grooves. In a particularly preferred embodiment, grooves that extend basically in the radial direction are provided in such a retainer.

A preferred torque sensor in accordance with the invention is equipped with a retainer that holds at least one transmitting element, as well as at least one ramp that is arranged on the input member and/or output member of the torque sensor. In a particularly preferred embodiment, those ramps interact with the retainer and the transmitting elements in such a way that through a combination of the degrees of freedom that the transmitting elements have on the ramps on one hand, and the degrees of freedom that the transmitting elements have in the retainer on the other hand, it is ensured that the various transmitting elements have the same radial position, respectively.

In a particularly preferred embodiment, a ramp, and especially a ramp that is associated with an output member of the torque sensor and along which a transmitting element can travel, is connected with a conical disk or arranged on a conical disk, wherein that ramp possibly has the design of a recess in the conical disk.

The output member of the torque sensor is preferably designed as one piece together with a disk of the disk set that is associated with that torque sensor.

The torque sensor preferably has a ramp system whose ramps may have a constant slope.

In a particularly preferred embodiment the ramp system, and possibly the individual ramps or at least some of the individual ramps of the ramp system, has a constant slope, wherein it is preferably additionally ensured that the transmitting elements that can travel, particularly in contact, between or at least along a ramp of that ramp system of the torque sensor, each take on a position in the radial direction of that ramp system as the one in which an endless, torque-transmitting means is arranged in the radial direction on a conical disk set that is associated with that torque sensor.

The input member and the output member of the torque sensor and/or the ramp system are preferably arranged in such a way that they can move relative to each other, especially in the circumferential direction, and possibly in the axial direction. In a particularly preferred embodiment, at least one transmitting element that is arranged between the input member and the output member is guided along at least one ramp during a relative movement of those parts. That ramp is arranged on the input member and/or the output member.

During a relative movement between the input member and the output member the transmitting element preferably is in contact with at least one ramp, in a particularly preferred embodiment with all neighboring ramps.

In a preferred embodiment, at least one ramp is arranged on the input member and/or the output member, respectively, of the torque sensor and/or the ramp system, wherein interaction of those tracks with at least one transmitting element, and possibly with a retainer, determines the travel track of the transmitting element or elements during a relative movement of those ramps.

The lengthwise direction of at least one ramp that is provided on the input member and/or on the output member of the torque sensor preferably extends also in the radial direction in each position of that ramp. In a preferred embodiment, the lengthwise direction of the ramp extends in such a way that basically no areas exist that run only in the circumferential direction.

In a particularly preferred embodiment, at least one ramp of the torque sensor has a curved design. Preferably, at least one ramp or exactly one curved ramp is provided both on the input member and on the output member. In a preferred embodiment, a ramp that is arranged on the input member and/or on the output member has a spiral design. A ramp that is arranged on the input member and/or on the output member preferably extends from an area that is arranged largely radially in the center of that input member and/or that output member in a radially outwardly curved and/or spiral shaped manner, clockwise or counterclockwise. The curved ramp preferably has a constant curvature direction, i.e., is continuously left-curved or continuously right-curved. Tracks that are left-curved in certain sections and right-curved in certain other sections are also preferred.

In a preferred embodiment, the (partial) ramp system that is provided on the input member has a design that is identical to that of the (partial) ramp system provided on the output member when viewed from above. In a particularly preferred embodiment a (partial) ramp system that is provided on the input member has a design that is different from the (partial) ramp system that is arranged on the output member when viewed from above.

A ramp or a ramp system is preferably arranged on the input member as well as on the output member, with those ramps facing each other.

In a preferred embodiment, the position of the torque sensor and/or the position of the transmitting element or elements is basically clearly determined relative to the ramp system in a given position of the disk sets of a continuously variable transmission. In a particularly preferred embodiment, the transmitting element, or elements, always takes on the same position in the radial direction and/or relative to the respective tracks with equal and/or reproduced transmission ratios of the continuously variable transmission, particularly independently of its direction of rotation.

The input member, and/or the output member, of the torque sensor is preferably designed as one piece.

In the preferred embodiments of the invention, where it was mentioned that proportionality exists, the proportionality factor is smaller than 1, or equal to 1, or larger than 1.

In a particularly preferred embodiment a safety factor is utilized that offers additional safety that sufficient pressing force is always available. That safety factor can be an absolute increase, possibly in addition to the proportionality factor, or be taken into consideration in the proportionality factor, e.g., as a percentage increase.

In a particularly preferred embodiment those ramps of the torque sensor are designed in such a way that on one hand they extend at least in the radial direction of the torque sensor, and that on the other hand at least one of those tracks has a slope so that the output member is shifted axially relative to the input member when the transmitting element changes its position on the track and/or ramp.

It should be noted that a track and/or a ramp in accordance with the present invention should be interpreted particularly as an area of the input member and/or an area of the output member of the torque sensor or a ramp system, which can support one or several transmitting elements and through which those transmitting elements can possibly be exposed to load, wherein that track and/or ramp can have a profiled or non-profiled design and can have a slope or not have a slope.

The track or ramp may possibly have the design of a profiled recess, wherein in a preferred embodiment a transmitting element can travel along the ramp and/or track. The term track and/or ramp in accordance with the invention however should be interpreted in a broader sense, so that a track includes a longitudinal expansion or no longitudinal expansion. A track should be particularly interpreted as a channel-like area that is equipped with a triangular or rounded or rectangular or otherwise designed cross-sectional area, or a holding device for holding a transmitting element. A preferred embodiment furthermore is a design where a transmitting element in the shape of a ball is in one way retained on the input member or on the output member in a holding retainer that is also designated as a track and/or ramp, and where the other one of those parts contains a longitudinally extending track, e.g. a track that is designed as a profiled recess, along which the transmitting element can travel. In accordance with the invention, the term "track" is also used in the sense of a travel track and/or travel line, particularly relative to the transmitting element.

In accordance with the present invention in particular a track is a ramp and/or a ramp is a track, wherein the term track and/or ramp relates particularly to a track and/or ramp that is arranged on the input member or on the output member.

A ramp in accordance with the present invention should particularly also be understood as a ramp in the classical sense that contains along its lengthwise direction an inclination or slope that can be constant or that can vary along the lengthwise direction. In a particularly preferred embodiment, a torque sensor in accordance with the invention is equipped with a ramp that has a largely constant slope in the lengthwise direction.

The tracks and/or ramps that are arranged on the input member can have the same design or different designs compared with those that are arranged on the output member.

In accordance with the present invention a continuously variable transmission should be interpreted particularly as a transmission wherein torque is transmitted through an endless, torque-transmitting means, such as a chain or belt or similar. That continuously variable transmission preferably contains at least some of the following features: A preferred continuously variable transmission is equipped with an input disk set as well as an output disk set. Those disk sets are each equipped with two disks that can be moved relative to each other, especially in the axial direction, so that their spacing can be changed. In particular, the respective disks of a disk set are designed as conical disks that face each other at their tapered ends. In a preferred embodiment, torque is transmitted between those disk sets through frictional engagement between the respective disk set and the endless, torque-transmitting means. In a particularly preferred embodiment torque is transmitted through a plate-link chain, wherein the plate-link chain contains chain links that are connected with each other through link elements. The link elements are preferably designed in such a way that two rocker members that are associated with each other as well as with the same link elements, roll or ride against each other relative to that link element during a tilting movement of the adjacent chain links. At least one of those rocker members preferably extends sideways beyond the plate-link sets and can be supported on the disks and/or conical disks of the respective disk sets through frictional engagement, so that torque is transmitted between the respective conical disk sets and the plate-link chain via the rocker members that in particular engage with the links of the plate-link chain in a positive lock. The rocker members may be rounded or tapered or designed otherwise at their ends for that purpose. Within each chain link several plate links are arranged that are aligned parallel to each other or at an angle to each other or otherwise. The plate links within a chain link can be identical or have different designs. The plate links of different chain links can be identical or have different designs. Different chain links have identical or differing separations.

In accordance with the invention, a torque sensor for a continuously variable transmission is provided that can transmit torque in a frictionally-engaged manner. For the purpose of frictionally-engaged torque transmission via the continuously variable transmission, a pressing force is required that depends on the adjusted transmission ratio as well as the torque that is applied, and thus has a transmission-ratio-dependent portion and a torque-dependent portion. The torque sensor generates a pressing force that contains a power portion that is proportional to the transmission-ratio-dependent portion and/or to the torque-dependent portion of the required pressing force.

Applying load to the disks and/or conical disks that are associated with a disk set, respectively, causes the friction force between the plate-link chain and the respective disks to be sufficient for the respectively desired torque transmission. The forces acting, particularly axially, on the respective disks of a disk set are preferably controlled as a function of the torque to be transmitted and/or the adjusted transmission ratio, particularly relative to each individual disk set. In particular, on different disk sets different forces act in the axial direction on the disks of the disk sets.

The different disk sets are preferably associated with separate torque sensors. One torque sensor may possibly be associated with several disk sets, wherein transmission ratio devices are preferably incorporated in the transmitting section between the torque sensor and the respective disk sets that in that case can be differently configured and can be controlled.

In a preferred embodiment, a disk set of the continuously variable transmission is associated with a torque sensor that controls the pressing force on that disk set, while on the other disk set the pressing force is controlled in a different manner, e.g., through a spindle or similar device.

The continuously variable transmission can also have a different design.

In a particularly preferred embodiment, the torque sensor has the design of a mechanical torque sensor. In a particularly preferred embodiment, load is applied to the disk set through the torque sensor via mechanical components that interact with each other without providing a pressure fluid in the transmitting section.

In accordance with the invention, a continuously variable transmission is equipped with at least one torque sensor as well as with a device that ensures that the power transmission between an input member and an output member of the torque sensor takes place basically in the radial position that corresponds to the travel radius of an endless, torque-transmitting means that is incorporated on the disk set that is associated with that torque sensor. That power transmission is effected especially through a transmitting device, such as a ball or similar.

The invention particularly provides for the fact that a signal that indicates that the transmission ratio of the continuously variable transmission should be changed is generated for the purpose of controlling a torque sensor or for controlling a continuously variable transmission having a torque sensor under defined circumstances. The transmission ratio of that continuously variable transmission is changed as a function of that signal, particularly by changing the respective axial spacings of the disks that are associated with the respective disk sets of that transmission. In particular, that causes the radial position of an endless, torque-transmitting means that extends around the disk sets, to be changed as a function of the slope of the respective disks. In accordance with the invention, it is ensured that a transmitting element that can transmit power and/or torque between an input member and an output member of a torque sensor, is arranged, respectively, in the radial position, in which the endless, torque-transmitting means is arranged on one of those disk sets. That disk set is especially a disk set that is associated with the appropriate torque sensor.

Preferably, one torque sensor is associated with each of the disk sets of the continuously variable transmission, wherein with an appropriate adjustment of those disk sets it is ensured that a transmitting element of the respective torque sensor is held in the radial position, in which the endless, torque-transmitting means extends around the associated disk set.

In accordance with the present invention, the term "controlling" should be interpreted particularly as "regulating" and/or "controlling" pursuant to DIN (German Industry Standard). The same applies to terms derived from the term "controlling."

BRIEF DESCRIPTION OF THE DRAWINGS

The following description explains the invention and/or the aspects of the invention more closely based upon the drawing figures, which description is not intended to limit the scope of the invention.

In the drawings.

DESCRIPTION OF THE PREFERRED EMBODIMENTS

Figure 1:
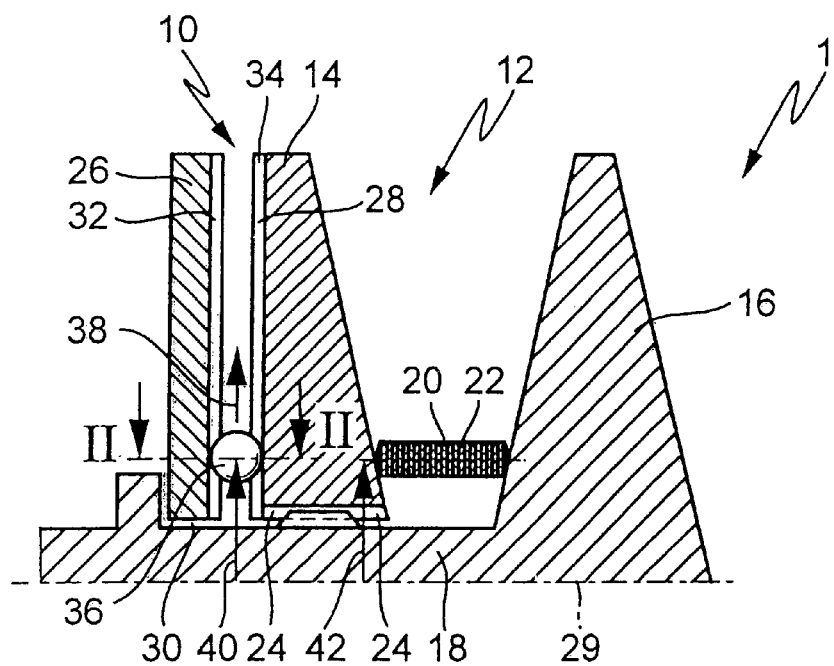
FIG. 1 shows an exemplary embodiment of the invention in a partial diagrammatic view.

FIG. 1 shows an exemplary embodiment of the invention in a partial cross-sectional view.

FIG. 1 in particular shows a portion of a continuously variable transmission 1 with a torque sensor 10.

The continuously variable transmission 1 is equipped with disk sets 12, of which one is shown in a partial view in FIG. 1. The disk set 12 is equipped with a first conical disk 14 as well as a second conical disk 16. Conical disks 14, 16 contain areas that taper radially outwardly and that face each other.

The first conical disk 14 as well as the second conical disk 16 extend concentrically around the axis of a shaft 18. The shaft 18 is connected with the second conical disk 16 in an axially fixed as well as a non-rotatable manner. The first conical disk 14 is non-rotatably arranged on the shaft 18 in an axially movable manner. A plate-link chain 20 extends around the disk sets 12, whose conical disks 14, 16 are arranged so they can move in the axial direction relative to each other and/or are displaceable relative to each other. The plate-link chain 20 is equipped with a plurality of plate links 22 that extend—not shown in FIG. 1—between link elements, respectively.

In order to effect the axial movability of the first conical disk 14 relative to the shaft 18 and/or the second conical disk 16 on one hand, and the non-rotatability on the other hand, suitable bearing devices 24 are provided between the first conical disk 14 and the shaft 18, such as a spline or similar.

The torque sensor 10 is equipped with an input member 26 as well as an output member 28 that are respectively arranged concentrically to the shaft 18. The input member 26 and the output member 28 may each have a disk-shaped design.

The output member 28 is non-rotatably arranged, and possibly in a fixed manner in the axial direction, relative to the first conical disk 14 and may be firmly connected with it. In particular, the output member 28 is designed as one piece with the first conical disk 14.

The input member 26 is arranged in a rotatable manner relative to the output member 28, relative to the axis 29 of the shaft 18. For that purpose, suitable bearing devices 30 may be provided between the input member 26 and the shaft 18.

A first track and/or ramp 32 is incorporated on the input member 26, and a second track and/or ramp 34 is incorporated on the output member 28. Those ramps 32, 34 face each other, from an axial direction point of view. If necessary, the first ramp 32 is a configuration of several ramps and the second ramp 34 is also a configuration of several ramps. Those ramps 32, 34 extend particularly in the radial direction as well as the circumferential direction relative to the input member 26 and/or the output member 28.

It should be noted that, even if that is not mentioned specifically, the first ramp 32 and/or the second ramp 34 should be interpreted particularly as a configuration of tracks or ramps in accordance with the present invention in the above-mentioned sense or as an individual ramp.

A spreading and/or transmitting element in the design of a ball 36 is arranged between the first ramp 32 and the second ramp 34. Also relative to that transmitting element, it should be noted that in accordance with the present invention even if it is not pointed out specifically, it should be understood that a plurality of transmitting elements are provided, wherein it is particularly preferred that those respective transmitting elements are associated with an individual first ramp 32 as well as with an individual second ramp 34, respectively.

Power or torque can be transmitted between the first ramp 32 and the second ramp 34 by balls 36. In particular, a relative rotation of the input member 26 compared to the output member 28 and/or of the first ramp 32 compared to the second ramp 34 causes the axial spacing of the first ramp 32 from the second ramp 34 and/or between the input member 26 and the output member 28 to change.

In accordance with the invention, a particular feature is that the input member 26 and/or the first ramp 32 is arranged in an axially fixed manner, so that a change of the axial spacing between the input member 26 and the output member 28 simultaneously causes the axial spacing between the output member 28 and the second conical disk 16 to change.

The ball 36 is arranged in a movable manner in the radial direction, as indicated by the arrow 38. The ability of that ball 36 to move is particularly determined by the design of the first ramp 32 as well as the second ramp 34.

The travel path and/or the degrees of freedom of the ball 36 are designed so as to allow ball 36 to only move in the radial direction relative to the shaft 18, or so as to arrange that ball 36 is movable both in the radial and in the circumferential direction relative to the shaft 18.

The radial position of the ball 36 relative to the shaft 18 that is indicated by the arrow 40, always corresponds to the radial position and/or the travel radius of the plate-link chain 20 that is indicated by the arrow 42. In accordance with the invention in particular, those radii 40, 42 are always controlled to be identical. That type of control is preferably effected by the design of the first ramp 32 as well as the second ramp 34 and/or the interaction of those ramps 32, 34 with the ball 36.

Figure 2:
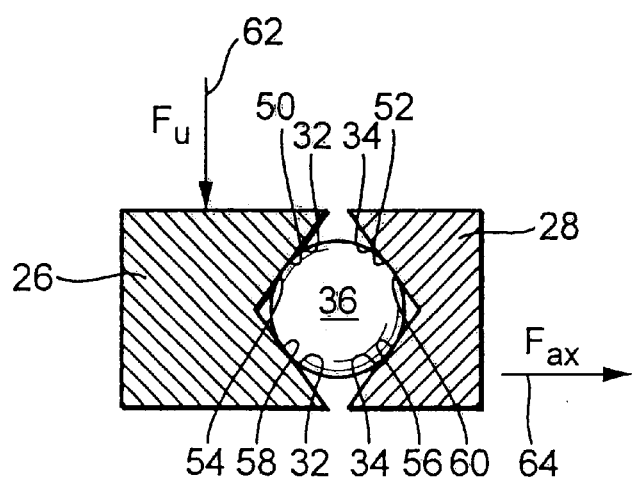
FIG. 2 is a sectional view taken along the line 2—2 of FIG. 1.

FIG. 2 depicts a sectional view along the line 2—2 of FIG. 1.

FIG. 2 especially shows that the first track 32 has a first recess 50 and/or has the design of a first recess 50 on the input member 26, and that the second track 34 has a second recess 52 and/or has the design of a second recess 52 on the output member 28.

In FIG. 2 the first recess 50 as well as the second recess 52 are each V-shaped so that the first recess 50 contains a first surface 54 that is arranged diagonally opposite a first surface 56 of the second recess 52, and that the first recess 50 contains a second surface 58 that is arranged diagonally opposite a second surface 60 of the second recess 52. The first surface 54 forms an angle with the second surface 58, and the first surface 56 forms an angle with the second surface 60.

Those angles can basically be of any arbitrary size, and can range in a particularly preferred embodiment between 30° and 60°.

When a circumferential force is applied to the input member 26, as indicated by the arrow 62, it causes also at least a force in the axial direction to be applied to the output member 28, as indicated by the arrow 64.

Figure 3:
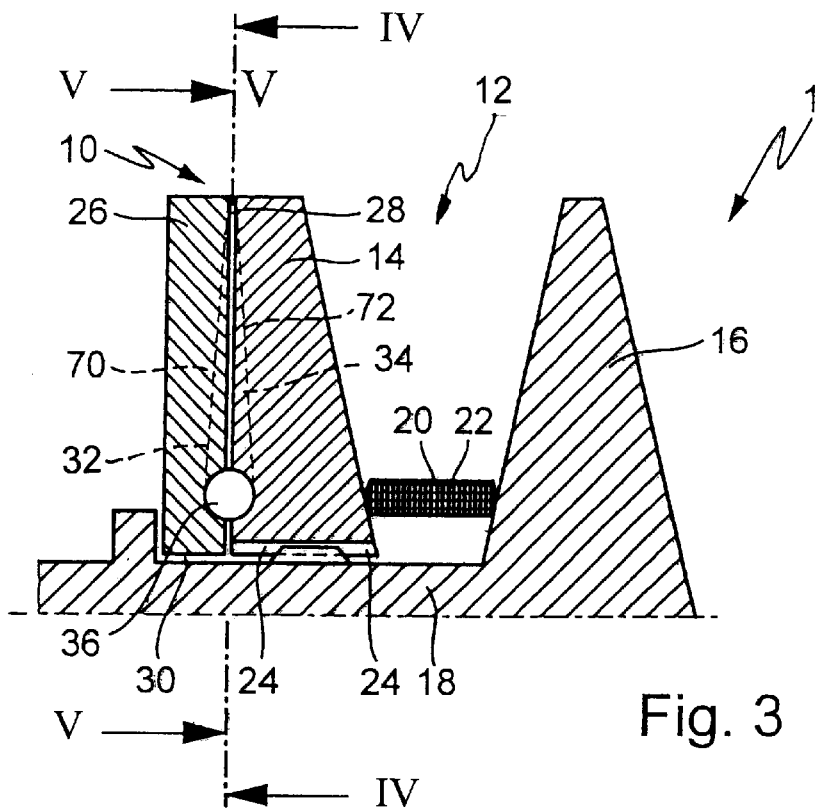
FIG. 3 shows another exemplary embodiment of the invention in a partial diagrammatic view.

FIG. 3 depicts a representation of an embodiment in accordance with the invention that corresponds largely with the representation shown in FIG. 1.

The representation shown in FIG. 3 differs from the representation in accordance with FIG. 1 particularly in that—as indicated by the dashed lines 70, 72—the slope of the ramps is shown along their lengthwise direction and/or in the radial direction, wherein that slope is constant, especially along the respective ramps.

A first ramp 32, whose slope has such a design that it increases in a radially outward direction, especially at a constant level, is provided on the input member 26. The radially outward area of that first ramp 32 is thus arranged closer to the output member 28—in the axial direction—than the radially inward area of that first ramp 32.

Correspondingly, the slope of the second ramp 34 increases with increasing radius of the ramp position.

A sectional view of the ramp of FIG. 3 basically corresponds to the sectional view along the line 2—2 of FIG. 1, which is shown in FIG. 2.

Figure 4:
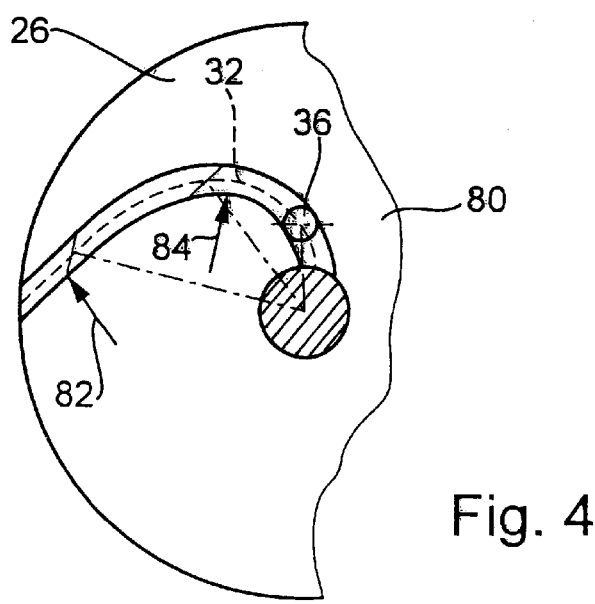
FIG. 4 is a sectional view taken along the line 4—4 of FIG. 3.

FIG. 4 shows a sectional view along the line 4—4 of FIG. 3.

In FIG. 4 a view of the input member 26 from the point of view of the ball 36 is shown, in a partial view.

FIG. 4 shows particularly the first ramp 32 that extends from the radially central area 80 of the input member 26—in a side view of the input member—counterclockwise radially outward in a spiral shape. The first ramp 32 here has a left-curved design when following it radially outward from the radially interior area 80. The radii of curvature, which are partially indicated by the arrows 82, 84, do not have a constant form. It should be noted, however, that in accordance with the invention it is also preferred that those radii of curvature have a constant form.

Figure 5:
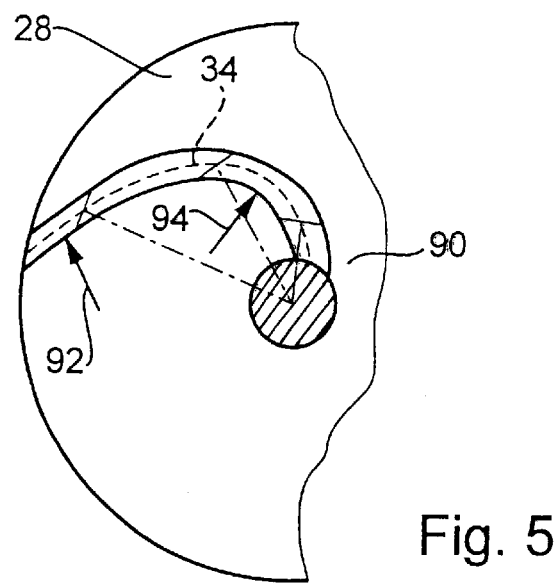
FIG. 5 is a sectional view taken along the line 5—5 of FIG. 3.

FIG. 5 shows a sectional view along the line 5—5 of FIG. 3.

FIG. 5 depicts especially a side view of the output member 28 of the torque sensor 10 from the point of view of the ball 36.

FIG. 5 shows that the ramp 34 of the output member 28 extends radially outward from the radially interior area 90 in a curved and/or spiral shape; it does so counterclockwise, from a side view. The radii of curvature that are indicated by the arrows 92, 94, have different forms along the ramp 34. It should be noted that in accordance with the invention it is also preferred that those bending radii have the same form. The track extends with a left curve, when viewing it from the side, from the central area outward.

It should be noted that the ramps 32, 34 shown in FIG. 4 and FIG. 5, respectively, could also be right-curved or be both right- and left-curved. The ramps shown in FIG. 4 and FIG. 5 can have the same design or different designs.

Figure 6:
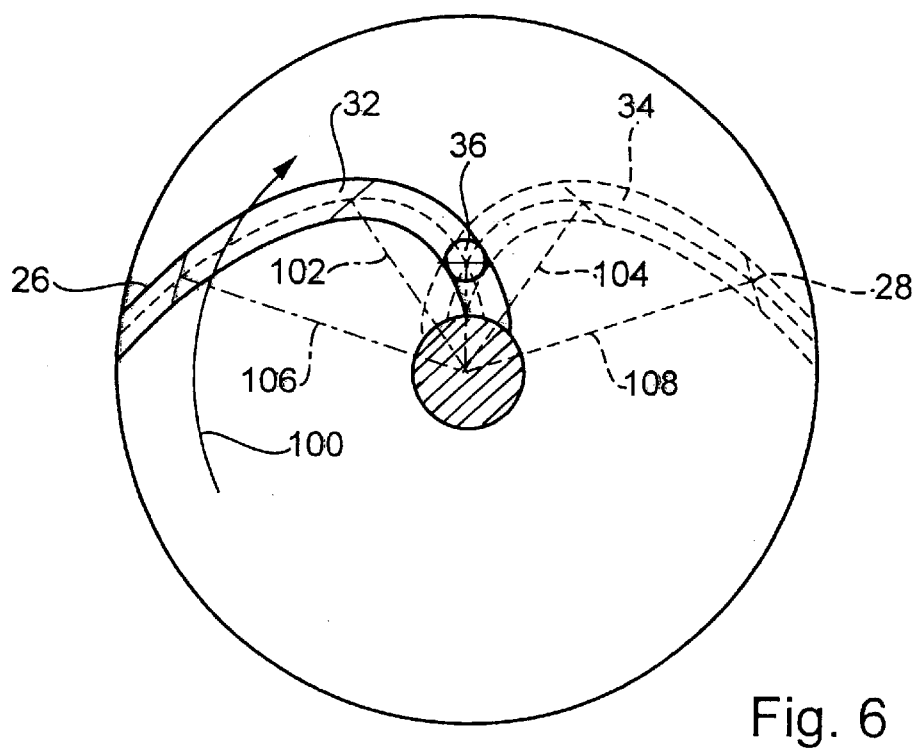
FIG. 6 shows a further exemplary embodiment of the invention in a partial diagrammatic view.

FIG. 6 depicts a partially shown torque sensor.

FIG. 6 especially shows an input member 26 with a first ramp 32 as well as an output member 28 with a second ramp 34, wherein a ball 36 functioning as the transmitting element is arranged between those ramps 32, 34.

The design of the parts 26, 28 and/or the ramps 32, 34 corresponds basically to the design that was explained with the help of FIGS. 4 and 5.

FIG. 6 clarifies that a torque load applied to the input member 26, indicated by the arrow 100, causes the ball 36 to be moved radially outward. The line pairs 102-104 and 106-108 indicate in which position the ball 36 is arranged on the respective tracks 32, 34 with an appropriate rotation that is associated with those positions, of the input member 26 compared to the output member 28. That clarifies that the ball is moved in the radial direction upon a relative rotation of the parts 26, 28. The radius, respectively, at which the ball is arranged, corresponds basically to the length of the lines 102, 104, and 106, 108 that are shown as examples in FIG. 6. It should be noted that the radial movement is determined not only by the lines shown in FIG. 6, but can be infinitely variable.

FIG. 6 shows that the ramps 32 and 34 that, as shown in FIG. 4 and 5, have the same design from a side view, extend in differing directions from the ball 36 when they face each other.

Figure 7:
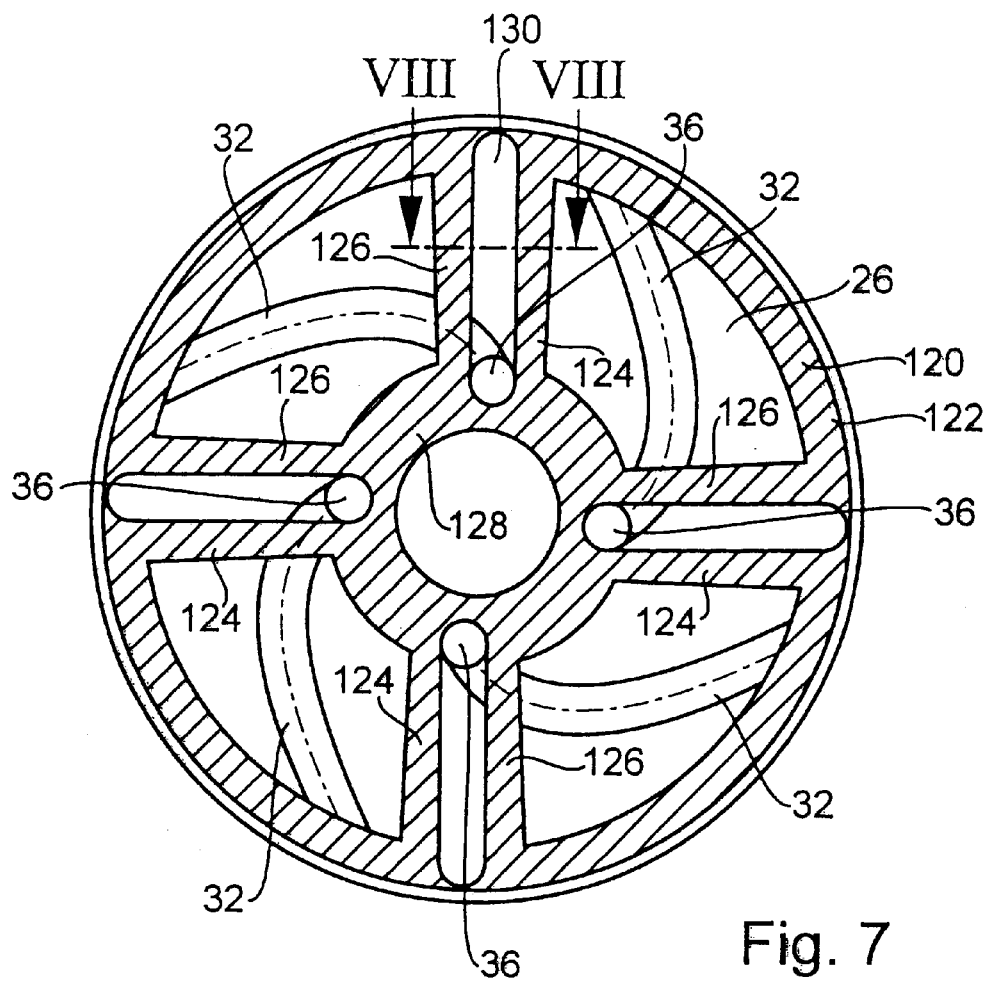
FIG. 7 shows another exemplary embodiment of the invention in a partial diagrammatic view.

FIG. 7 shows an exemplary embodiment of the invention in a partial view.

FIG. 7 especially depicts several first ramps 32 that are arranged on the input member 26 and have an identical contour and/or identical shape. Those first ramps 32 are arranged offset from each other in the circumferential direction of the input member 26. In particular, the included angle between two neighboring first ramps 32, respectively, in the circumferential direction is identical. FIG. 7 shows four first ramps 32 so that the angle between the respective neighboring ramps 32 is 90°.

A different number of first ramps 32 as well as different angle conditions are also preferred in accordance with the invention.

Each ramp 32 is associated with a second ramp 34—not shown in FIG. 7—which is arranged on the output member 28 that is also not shown.

Each of those ramps 32 is associated with a ball 36 that can travel along those respective ramps 32.

The different balls 36 operate together via a retainer 120. That retainer 120 is equipped with an outer ring 122 that is connected with an inner ring 128 of that retainer 120 via struts 124, 126. The outer ring 122 of the retainer 120 is arranged basically concentrically to the inner ring 128 of the retainer 120.

The struts 124, 126 are arranged in pairs basically parallel to each other, run in the radial direction, and have a profile that is not shown in FIG. 7.

The areas of the pairs of struts 124, 126 that face each other serve as guide surfaces for the balls 36 so that those balls 36 are guided both by the ramps 32 and, in the radial direction, by the pairs of struts 124, 126. That ensures that the different balls 36 are always arranged in the same position, in the radial direction.

The number of pairs of struts 124, 126 and/or the number of intervening spaces 130, which in particular have a groove-like design, provided between those struts 124, 126 preferably corresponds to the number of first ramps 32, so that each first ramp 32 is associated with intervening space 130.

Figure 8:
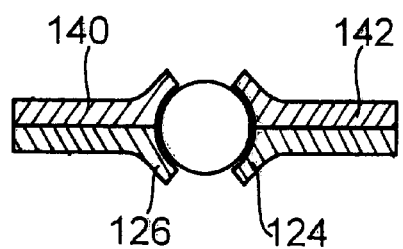
FIG. 8 is a sectional view taken along the line 8—8 of FIG. 7.

FIG. 8 shows a sectional view along the line 8—8 of FIG. 7.

FIG. 8 illustrates that the struts 124, 126 are connected with each other through plate-like areas 140, 142.

Those plate-like areas can possibly be foregone, and the retainer-like guide element can have a different design.

Figure 9:
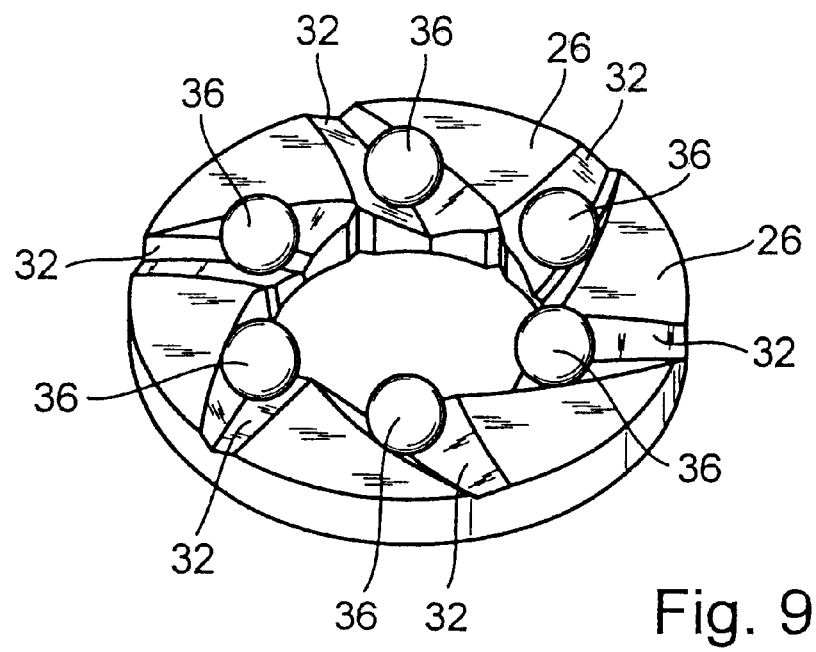
FIG. 9 shows a still further exemplary embodiment of the invention in a partial diagrammatic view.

FIG. 9 shows an exemplary embodiment of the invention in a diagrammatic, partial view.

Figure 10:
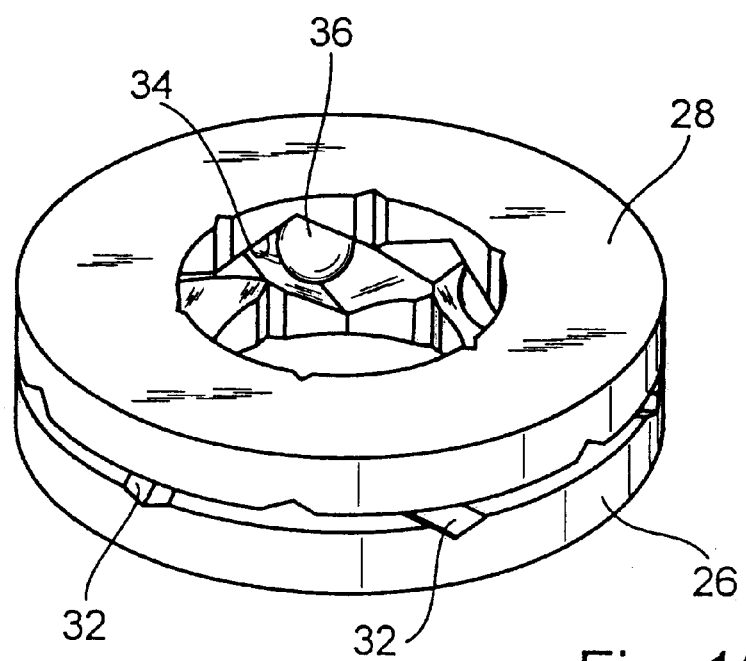
FIG. 10 shows another exemplary embodiment of the invention in a partial diagrammatic view.

FIG. 10 shows an input member 26 of a torque sensor with first ramps 32 and/or an output member 28 with second ramps 34.

In FIG. 10, six ramps 32 are depicted that each form an identical (60°) angle with the respective neighboring ramps 32. The number of ramps 32 as well as the angles between neighboring ramps 32 can differ as well.

Each ramp 32 includes a ball 36 that can transmit power and/or torque to the respective other part, i.e., the output member 28 and/or the input member 26. The ramps 32 have a slope that increases from radially outward to radially inward. The ramps 32 have a trough-like design and have slopes.

FIG. 10 shows an exemplary embodiment of the invention in a diagrammatic partial view.

In FIG. 10, the input member 26 is shown in particular with first ramps 32, as is an output member 28 that is associated with that input member 26. The output member 28 is equipped with second ramps 34, wherein each individual first ramp 32 is allocated a second ramp 34.

Figure 11:
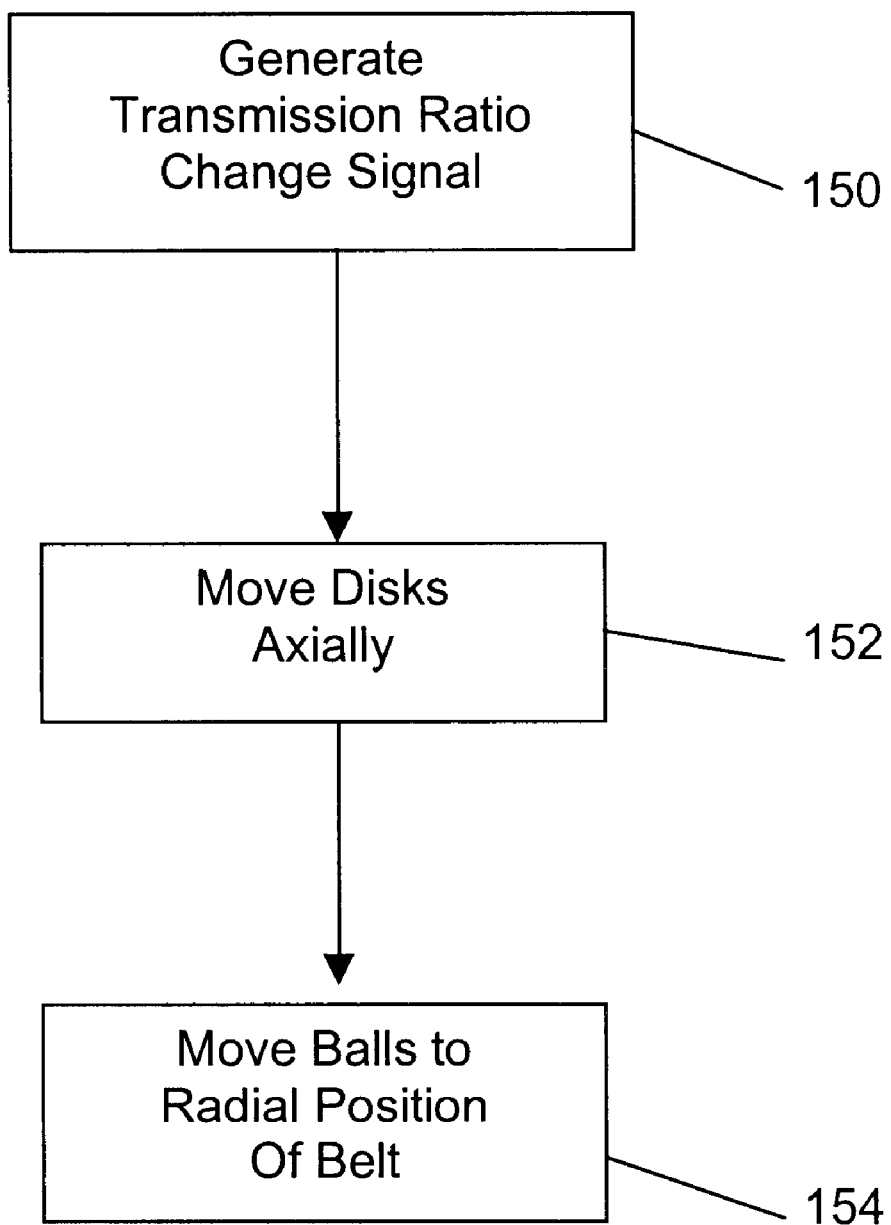
FIG. 11 shows an exemplary method embodiment of the invention in a partial diagrammatic view.

FIG. 11 shows the steps of an exemplary method in accordance with the invention.

In Step 150, a signal is generated that indicates that the transmission ratio of a continuously variable transmission is to be changed.

In Step 152, the transmission ratio of that continuously variable transmission is changed by modifying the respective axial spacings of the disks in the respective disk sets of that continuously variable transmission. For that purpose, the endless, torque-transmitting means of that continuously variable transmission is moved to different travel radii on the respective disk sets.

Step 154 ensures that the transmitting elements and/or the balls that are arranged between an input member and an output member of a torque sensor, are moved to the radius that corresponds to the travel radius of the endless, torque-transmitting means on the disk set that is associated with that torque sensor.

Step 154 may be performed parallel to step 152.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Because the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing, and operational procedures.

What is claimed is:

1. A continuously variable transmission, said transmission comprising:
   a first set of coaxial conical disks adapted for relative axial movement to vary the axial spacing between the first set of disks;
   a second set of conical disks adapted for relative axial movement to vary the axial spacing between the second set of disks, wherein the second set of disks is spaced from and opposite to the first set of disks so an axial space between the first set of disks is radially opposite from an axial space between the second set of disks;
   a power transmission member positioned to engage and to pass between the first and second sets of disks to transmit torque therebetween; and
   a torque sensor connected with at least one of the first and the second set of disks for sensing a torque level applied to the transmission and for generating a torque-dependent pressing force on a torque-transmitting member, said torque sensor including:
   at least one torque-receiving input member and at least one torque output member;
   a torque-transmitting member disposed between the at least one input member and the at least one output member, wherein the torque-transmitting member receives a pressing force from the input member to transmit power between the input and the output members, and
   wherein the torque-transmitting member positioned between the input member and the output member is movable radially, relative to an axis of rotation about which the input and output members can rotate, to impart a pressing force to the output member when an input torque is applied to the input member.

2. A continuously variable transmission in accordance with claim 1, wherein the torque that is transmitted between the input member and the output member contains a power component acting in the circumferential direction and a power component acting in the axial direction, and wherein the power component acting in the circumferential direction is proportional to a power component acting in the circumferential direction of power that is transmitted between the power transmission member and at least one of the first and second set of disks, wherein the torque sensor is connected to that at least one set of disks.

3. A continuously variable transmission in accordance with claim 1, wherein at least one ramp is provided on each of the input member and the output member, which ramps support the torque-transmitting member during a power transmission process between those members.

4. A continuously variable transmission in accordance with claim 3, wherein during a pushing operation in which torque is applied to the input member, as well as during a pulling operation in which torque is applied to the output member, power is transmitted between the ramps by the torque-transmitting member, and the deviation of the pressing force generated in the torque sensor from the pressing force required for torque transmission between the disk sets is substantially identical during the pushing operation and the pulling operation.

5. A continuously variable transmission in accordance with claim 3, wherein at least one ramp, along which at least one torque-transmitting member is movable, is connected with one disk of a set of disks.

6. A continuously variable transmission in accordance with claim 5, wherein the one disk is a conical disk.

7. A continuously variable transmission in accordance with claim 3, wherein at least one ramp extends as a recess in a disk of a set of disks with which the torque sensor is connected.

8. A continuously variable transmission in accordance with claim 3, wherein the at least one ramp has a substantially constant slope relative to a radial plane passing through the torque sensor.

9. A continuously variable transmission in accordance with claim 3, wherein at least one torque-transmitting member is guided along at least one ramp during relative rotational movement between the input member and the output member of the torque sensor.

10. A continuously variable transmission in accordance with claim 3, wherein the input member and the output member each include at least one ramp that receives at least one torque-transmitting member therebetween and that a travel path of the torque-transmitting member during a relative rotational movement of the input and output members.

11. A continuously variable transmission in accordance with claim 3, wherein the at least one ramp has a curved shape in a radial plane.

12. A continuously variable transmission in accordance with claim 11, wherein the at least one ramp has a spiral shape in a radial plane.

13. A continuously variable transmission in accordance with claim 1, wherein the radial position of the torque-transmitting member is controlled as a function of the radial position of the power transmission member with respect to the disk set with which the torque sensor is connected.

14. A continuously variable transmission in accordance with claim 1, wherein the radial position of the torque-transmitting member corresponds substantially with the radial position of the power transmission member in relation to the first and second set of disks.

15. A continuously variable transmission in accordance with claim 1, wherein the radial position of the power transmission member relative to a set of disks is at substantially the same radial position as the torque-transmitting member for a torque sensor connected with that set of disks.

16. A continuously variable transmission in accordance with claim 1, wherein movement of the torque-transmitting member is guided in a predetermined manner.

17. A continuously variable transmission in accordance with claim 1, wherein radial movements of the power transmission member relative to a set of disks are coupled with radial movements of the torque-transmitting member of a torque sensor connected with that set of disks.

18. A continuously variable transmission in accordance with claim 1, wherein the radial position of the torque-transmitting member is dependent upon the transmission ratio of the transmission.

19. A continuously variable transmission in accordance with claim 1, including at least two torque-transmitting members, wherein the travel paths of the at least two torque-transmitting members are coupled with each other.

20. A continuously variable transmission in accordance with claim 19, wherein the two torque-transmitting members are carried in a retainer.

21. A continuously variable transmission in accordance with claim 20, wherein the retainer includes grooves along which the torque-transmitting members are movable.

22. A continuously variable transmission in accordance with claim 21, wherein at least one groove of the retainer extends in a substantially radial direction.

23. A continuously variable transmission in accordance with claim 1, wherein the torque output member is integrally formed with a disk of a set of disks with which the torque sensor is connected.

24. A continuously variable transmission in accordance with claim 1, wherein a circumferentially directed power component of power transmitted between the input member and the output member of the torque sensor corresponds substantially with a circumferentially-directed power component of power transmitted between a disk set connected with the torque sensor and the power transmission member.

25. A continuously variable transmission in accordance with claim 1, wherein each set of disks is connected with a separate torque sensor.

26. A method for controlling a torque sensor carried by a continuously variable transmission, said method comprising the steps of:

generating a signal indicative that the transmission ratio of the continuously variable transmission is to be changed;

changing the transmission ratio of the continuously variable transmission by changing axial distances between pairs of axially-movable conical disks, between each of which an endless, torque-transmitting means passes to transmit torque between the pairs of disks to shift the radial position of the torque-transmitting means within each pair of disks; and providing a torque sensor having an axis of rotation and at least one power transmitting element between an input member of the torque sensor carried by the continuously variable transmission and an output member of the torque sensor, wherein the power transmitting element is movable radially relative to the torque sensor axis for transmitting torque between the torque sensor input and output members.

\* \* \* \* \*

UNITED STATES PATENT AND TRADEMARK OFFICE
CERTIFICATE OF CORRECTION

PATENT NO. : 6,575,047 B2
DATED : June 10, 2003
INVENTOR(S) : Wolfgang Reik et al.

It is certified that error appears in the above-identified patent and that said Letters Patent is hereby corrected as shown below:

<u>Title page,</u>
Item [73], Assignee, the Assignee's name is corrected to read as follows
-- LuK Lamellen und Kupplungsbau Beteiligungs KG, Bühl (DE) --.

Signed and Sealed this

Ninth Day of September, 2003

JAMES E. ROGAN
*Director of the United States Patent and Trademark Office*